United States Patent [19]
Arcas et al.

[11] Patent Number: 5,923,003
[45] Date of Patent: Jul. 13, 1999

[54] EXTENDED REACTION ACOUSTIC LINER FOR JET ENGINES AND THE LIKE

[75] Inventors: Noe Arcas, Plainview, N.Y.; Frederick M. Hutto, Stuart, Fla.; Charles A. Parente, Oyster Bay, N.Y.

[73] Assignee: Northrop Grumman Corporation, Los Angeles, Calif.

[21] Appl. No.: 08/982,710

[22] Filed: Dec. 2, 1997

Related U.S. Application Data

[63] Continuation-in-part of application No. 08/709,893, Sep. 9, 1996., Pat. No. 5,721,402

[51] Int. Cl.⁶ ........................................................ E04B 1/82
[52] U.S. Cl. ............................ 181/292; 181/213; 181/214
[58] Field of Search ..................................... 181/213, 214, 181/290, 292; 428/116, 117, 118; 52/806

[56] References Cited

U.S. PATENT DOCUMENTS

| | | |
|---|---|---|
| 3,769,767 | 11/1973 | Scott . |
| 3,821,999 | 7/1974 | Guess et al. . |
| 3,887,031 | 6/1975 | Wirt . |
| 3,895,152 | 7/1975 | Carlson et al. . |
| 3,910,374 | 10/1975 | Holehouse . |
| 3,948,346 | 4/1976 | Schindler . |
| 4,001,473 | 1/1977 | Cook . |
| 4,035,535 | 7/1977 | Taylor . |
| 4,850,093 | 7/1989 | Parente ...................................... 29/428 |
| 5,000,998 | 3/1991 | Bendig et al. . |
| 5,180,619 | 1/1993 | Landi et al. ............................. 428/116 |
| 5,192,623 | 3/1993 | Gewelber ................................. 52/806 |
| 5,543,198 | 8/1996 | Wilson .................................... 428/116 |
| 5,618,363 | 4/1997 | Mullender et al. ..................... 181/292 |
| 5,743,488 | 4/1998 | Rolston et al. ......................... 181/214 |

*Primary Examiner*—Khanh Dang
*Attorney, Agent, or Firm*—Terry J. Anderson; Karl J. Hoch, Jr.

[57] ABSTRACT

An extended reaction acoustic liner for use in jet engine noise mitigation has a substantially non-porous outer layer, a honeycomb core disposed in laminar juxtaposition to the outer layer, and a porous inner layer in laminar juxtaposition to the honeycomb core such that the honeycomb core is sandwiched between the outer layer and the inner layer. The honeycomb core comprises a plurality of cell walls defining a plurality of cells. Some of the cells are in fluid communication with one another via the openings formed in the cell walls. The openings in the cell walls cause viscous acoustic losses, resulting in acoustic energy dissipation and enhanced noise attenuation.

19 Claims, 1 Drawing Sheet

EXTENDED REACTION ACOUSTIC LINER FOR JET ENGINES AND THE LIKE

RELATED APPLICATION

This patent application is a continuation in part patent application of U.S. Ser. No. 08/709,893 filed Sep. 9, 1996, now U.S. Pat. No. 5,721,402, and entitled NOISE SUPPRESSION SYSTEM FOR A JET ENGINE, the contents of which are hereby incorporated by reference.

FIELD OF THE INVENTION

The present invention relates generally to jet engine noise suppression and more particularly to an extended reaction acoustic liner for mitigating jet engine noise by enhancing viscous acoustic losses within the liner, so as to facilitate enhanced acoustic energy dissipation.

BACKGROUND OF THE INVENTION

In order to mitigate the noise generated by a jet engine, the jet engine inlet and exhaust duct walls are constructed with noise absorbing material. This is particularly desirable for commercial passenger aircraft, since such aircraft are required to meet stringent government noise regulations. Such noise suppression for commercial passenger aircraft is also desirable so as to enhance the comfort of the passengers thereof.

Additionally, many localities have noise regulations which limit the amount of noise that an aircraft may make in order to prevent annoying nearby residents. This sometimes limits the types of aircraft that may utilize a particular airport. It also frequently imposes procedural restrictions upon aircraft which would otherwise be undesirably. For example, aircraft may be required to fly over designated neighborhoods at a prescribed minimum altitude. Flying at such a minimum altitude may undesirably increase fuel consumption and may also possibly accelerate engine wear (particularly when the minimum altitude must be reached immediately after takeoff).

According to contemporary methodology, a noise suppressing material sold under the name DYNAROHR (a registered trademark of Rohr Industries, Inc.), is utilized extensively for this purpose. The DYNAROHR product is formed of a honeycomb material which is disclosed in U.S. Pat. No. 4,379,191, the contents of which are hereby incorporated by reference. This honeycomb material comprises a core having a plurality of open cells. The core is sandwiched between an outer non-porous layer and an inner porous layer. The inner porous layer is in fluid communication with the open cells of the honeycomb material. A microporous sheet material, such as one comprised of finely woven stainless steel cloth, is bonded over the porous sheet and forms a part of the inner surface of the jet engine's inlet duct.

Although such sound suppressing materials and techniques have proven generally useful for their intended purposes, to date no such material has provided the degree of noise suppression desired for future more stringent noise reduction requirements for use in jet engine applications. As such, it is beneficial to provide a structure which substantially mitigates the noise generated by a jet engine, so as to facilitate compliance with governmental regulations and thus enhance passenger comfort and also mitigate the annoyance of people residing near an airport.

SUMMARY OF THE INVENTION

The present invention specifically addresses and alleviates the above mentioned deficiencies associated with the prior art. More particularly, the present invention comprises an extended reaction acoustic liner for use in jet engine noise mitigation. The liner comprises a substantially non-porous outer layer, a honeycomb core disposed in laminar juxtaposition to the outer layer, and a porous inner layer in laminar juxtaposition to the honeycomb core, such that the honeycomb core is sandwiched between the outer layer and the inner layer.

The honeycomb core comprises a plurality of cell walls defining a plurality of cells. At least some of the cells are in fluid communication with one another via openings formed in the cell walls.

The number of cells which are in fluid communication with one another is determined by the degree of viscous acoustic loss desired. As those skilled will appreciate, a cell may be in fluid communication with one or more of its neighbors. Thus, according to the present invention, a cell may be in fluid communication with some or all of its neighbors. Indeed, the number of neighbors with which a cell is in fluid communication may vary from one cell to another. Thus, for example, one cell may be in fluid communication with two of its neighbors while another cell is in fluid communication with three of its neighbors.

The openings in the cell walls cause viscous acoustic losses, thereby resulting in acoustic energy dissipation according to well known principles. Such acoustic energy dissipation desirably enhances noise attenuation, thereby substantially reducing the intensity of noise radiated by a jet engine or the like.

According to the preferred embodiment, substantially all of the cells are in fluid communication with one another. Thus, substantially all of the cells have openings formed therein such that a fluid communication path is generally defined from any cell, to any other cell.

The size and number of openings in the cell walls are configured to provide the desired acoustic resistance.

The honeycomb may be comprised of metal, composite, or any other desired material.

The porous inner layer preferably comprises either a linear inner layer or a non-linear inner layer. As those skilled in the art will appreciate, a linear inner layer is defined by a micro-porous material, while a non-linear inner layer is defined by a perforate inner layer.

According to one embodiment of the present invention a plurality of alternating layers of honeycomb core and porous inner layer are disposed in laminar juxtaposition to the outer layer such that each layer of honeycomb core comprises a plurality of cells, some of the cells within at least one of the layers of honeycomb being in fluid communication with one another via openings formed in the cells walls thereof. Thus, for example, the extended reaction acoustic liner of the present invention may comprise multiple layers of honeycomb material, alternate ones of which comprise cells which are in fluid communication with one another, while the layers of honeycomb between these comprise cells which are not in fluid communication with one another. For example, if four layers of honeycomb core are utilized, the first and third layers may comprise walls having openings formed therein, while the second and fourth layers lack such openings. Preferably, the layers of honeycomb are separated by porous inner layers.

According to another preferred embodiment of the present invention, each layer of honeycomb core in a multilayer acoustic liner comprises cells which are in fluid communication with one another.

Thus, any desired combination of honeycomb core layers and/or porous inner layers may be utilized, wherein any of the honeycomb core layers may comprise a plurality of cells which are in fluid communication with one another or no cells which are in fluid communication with one another.

These, as well as other advantages of the present invention will be more apparent from the following description and drawings. It is understood that changes in the specific structures shown and described may be made within the scope of the claims without departing from the spirit of the invention.

DETAILED DESCRIPTION OF THE PREFERRED EMBODIMENT

The detailed description set forth below in connection with the appended drawings is intended as description of the presently preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

Figure 1:
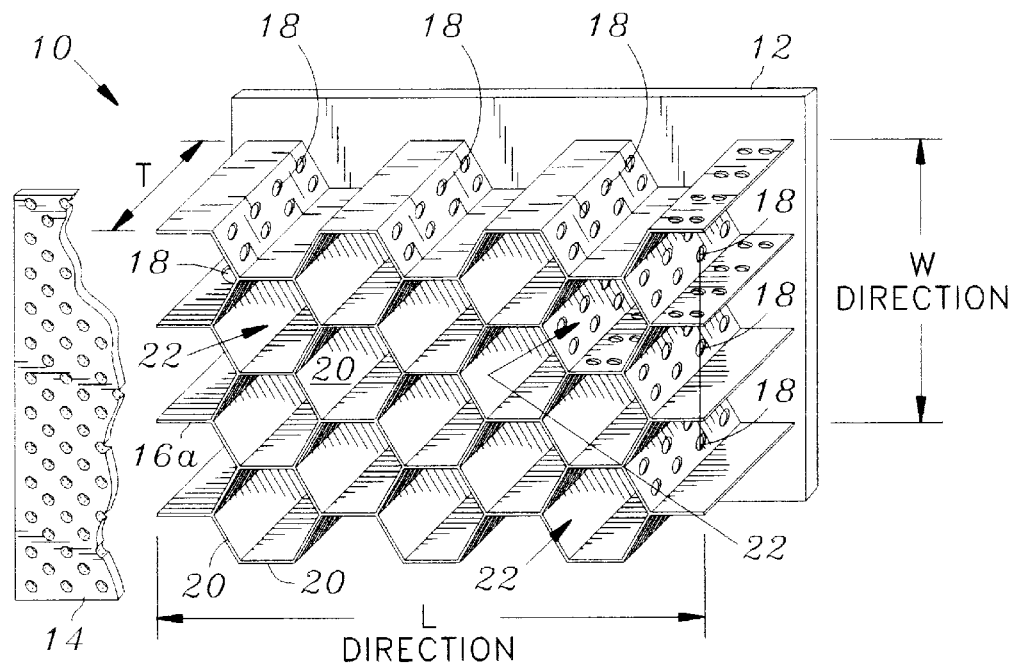
FIG. 1 is a perspective view of a first embodiment of the extended reaction acoustic liner of the present invention, having a portion of the inner layer broken away so as to show the honeycomb core and outer layer therebeneath and having an aspect ratio of approximately one.
Figure 2:
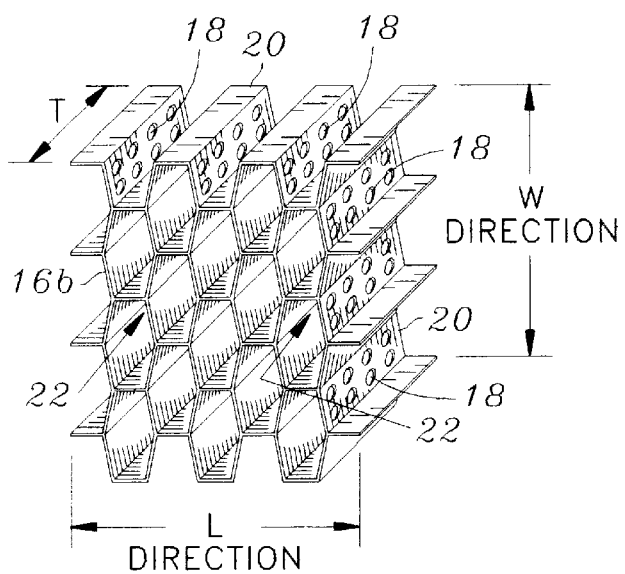
FIG. 2 is a perspective view of a second embodiment of the extended reaction acoustic liner of the present invention having a higher aspect ratio than the first embodiment thereof.

The extended reaction acoustic liner of the present invention is illustrated in FIGS. 1 and 2, which depict two presently preferred embodiments thereof. Referring now to FIG. 1, the first embodiment of the extended reaction acoustic liner 10 comprises a substantially non-porous outer layer 12, a porous inner layer 14, and a honeycomb core 16a disposed intermediate the outer core 12 and the inner core 14.

The outer layer 12, the inner layer 14, and the honeycomb core 16a may be comprised of any desired material. For example, the outer layer 12, the inner layer 14, and the honeycomb core 16a may be comprised of composite materials, plastics, and/or metal, in any desired combination thereof.

According to the preferred embodiment of the present invention, a plurality of openings 18 are formed in the cell walls 20 so as to place adjacent cells 22 in fluid communication with one another.

The number, configuration, size, and placement of the openings 18 are determined according to well known principles so as to provide the desired viscous acoustic losses. As is well known to one of ordinary skill in the art, "viscous acoustic losses" denotes the lessening of acoustic levels due to friction. In particular, in the context of sheet material having perforations, "viscous acoustic losses" denotes the lessening of acoustic pressure levels as a result friction between air and the inner surface of the perforations or openings as acoustic pressure waves pass therethrough. As such, with regard to the openings 18 such openings are preferably sized to be microporous in nature and approximately 0.002 to 0.006 inches in diameter. Because of the particular small sizing of the openings 18, air molecules passing through the small perforations must metaphorically squeeze-through as such must overcome the frictional resistance of the inner surface of the openings 18. The airflow within such small openings 18 is substantially laminar in nature. In order to size such small openings 18, various precise manufacturing techniques are contemplated, such as laser drilling, electron beam drilling and chemical etching. Thus, according to the present invention, some or all of the cells 22 are interconnected via openings 18. As those skilled in the art will appreciate, openings 18 may be formed in any wall 20 of any cell 22, as desired.

The aspect ratio of the honeycomb core is defined by the width (W) of a cell divided by the length (L) thereof and may be varied, as desired. For example, the honeycomb core 16a shown in FIG. 1 has an aspect ratio of approximately one, i.e., the width (W) of each cell 22 is approximately equal to the length (L) thereof.

Referring now to FIG. 2, the width of each cell of the honeycomb core 16b is approximately twice the length thereof, thus giving an aspect ratio of approximately two. As those skilled in the art will appreciate, the aspect ratio of the cells 22 of the honeycomb core may be varied, as desired, so as to provide the required structural and acoustic properties. The dimensions of the extended reaction acoustic liner of the present invention may be varied, as desired. For example, the outer layer 12 and the inner layer 14 may have a thickness of $\frac{1}{32}$ inch to $\frac{1}{8}$ inch, as desired, and the honeycomb core 16a, 16b, may have a thickness of $\frac{1}{16}$ inch to 1 inch, as desired. Further, various different cell sizes are contemplated. For example, the honeycomb core 16a, 16b may comprise cells having diameters or wall to wall dimensions of $\frac{1}{8}$ inch, $\frac{3}{8}$ inch, $\frac{1}{2}$ inch, or $\frac{3}{4}$ inch, or any other dimension, as desired. It is further contemplated that a non-uniform cell size may be desirable, wherein the diameters or wall to wall dimensions of the cells may vary, from one cell to another within a given honeycomb core 16a, 16b and/or from layer to layer.

Thus, it is understood that the exemplary extended reaction acoustic liner described herein and shown in the drawings represents only presently preferred embodiments of the present invention. Indeed, various modifications and additions may be made to such embodiments without departing from the spirit and scope of the invention. Thus, these and other modifications may be obvious to those skilled in the art and may be implemented to adapt the present invention for use in a variety of different applications.

What is claimed is:

1. An extended reaction acoustic liner for use in jet engine noise mitigation, the liner comprising:

a) a substantially non-porous outer layer;

b) a honeycomb core disposed in laminar juxtaposition to the outer layer, the honeycomb core comprising a plurality of cell walls defining a plurality of cells, each of the cell walls having a plurality of microporous openings sized and configured to channel laminar airflow therethrough, the mircroporous openings each having a frictional inner surface, some of the cells being in fluid communication with one another via the openings formed in the cell walls; and c) a porous inner layer in laminar juxtaposition to the honeycomb core such that the honeycomb core is sandwiched between the outer layer and the inner layer;

d) wherein the opening in the cell walls cause viscous acoustic losses, resulting in acoustic energy dissipation and enhanced noise attenuation.

2. The extended reaction acoustic liner as recited in claim 1, wherein substantially all of the cells are in fluid communication with one another.

3. The extended reaction acoustic liner as recited in claim 1, wherein the size and number of openings in the cell walls are configured to provide a desired acoustic resistance.

4. The extended reaction acoustic liner as recited in claim 1, wherein the honeycomb core is comprised of metal.

5. The extended reaction acoustic liner as recited in claim 1, wherein the honeycomb core is comprised of a composite material.

6. The extended reaction acoustic liner as recited in claim 1, wherein the porous inner layer comprises a linear inner layer.

7. The extended reaction acoustic liner as recited in claim 1, wherein the porous inner layer comprises a non-linear inner layer.

8. The liner of claim 1 wherein the openings having respective diameters in the range of 0.002 to 0.006 inches.

9. A jet engine having an acoustic liner for mitigating noise produced thereby, the jet engine comprising:
   a) an inlet;
   b) an exhaust;
   c) an acoustic liner covering a substantial portion of at least one of the inlet and the exhaust, the acoustic liner comprising;
      i) a substantially non-porous outer layer;
      ii) a honeycomb core disposed in laminar juxtaposition to the outer layer, each of the cell walls having a plurality of microporous openings sized and configured to channel laminar airflow therethrough, the mircroporous openings each having a frictional inner surface, some of the cells being in fluid communication with one another via the openings formed in the cell walls; and
      iii) a porous inner layer in laminar juxtaposition to the honeycomb core such that the honeycomb core is sandwiched between the outer and the inner layer;
   d) wherein the openings in the cell walls cause viscous acoustic losses, resulting in acoustic energy dissipation and enhanced noise attenuation.

10. The engine of claim 9 wherein the openings having respective diameters in the range of 0.002 to 0.006 inches.

11. A method for mitigating noise produced by a jet engine, the method comprising the steps of:
   a) forming at least one of an inlet and an exhaust of an extended reaction acoustic liner, the liner comprising:
      i) a substantially non-porous outer layer;
      ii) a honeycomb core disposed in laminar juxtaposition to the outer layer, each of the cell walls having a plurality of microporous openings sized and configured to channel laminar airflow therethrough, the mircroporous openings each having a frictional inner surface, some of the cells being in fluid communication with one another via the openings formed in the cell walls; and
      iii) a porous inner layer in laminar juxtaposition to the honeycomb core such that the honeycomb core is sandwiched between the outer and the inner layer;
   b) wherein the openings in the cell walls cause viscous acoustic losses, resulting in acoustic energy dissipation and enhanced noise attenuation.

12. The method of claim 11 wherein the openings having respective diameters in the range of 0.002 to 0.006 inches.

13. A method for forming an extended reaction liner for use in mitigating noise produced by jet engines, the method comprising the steps of:
   a) providing a substantially non-porous outer layer;
   b) forming a honeycomb core to the non-porous outer layer, the honeycomb core being comprised of a plurality of cells defined by a plurality of cell walls;
   c) forming microporous openings in the cell walls so as to place a plurality of the cells in fluid communication with one another, each of the cell walls having a plurality of microporous openings sized and configured to channel laminar airflow therethrough, the mircroporous openings each having a frictional inner surface; and
   d) forming a porous inner layer to the honeycomb core.

14. The method as recited in claim 13, wherein the step of forming the honeycomb core to the outer layer and step of forming the inner layer to the honeycomb core comprise adhesive bonding.

15. The method as recited in claim 13, wherein the step of forming the honeycomb core to the outer layer and the step of forming the inner layer to the honeycomb core comprise welding.

16. The method as recited in claim 13, wherein the step of forming openings in the cell walls comprises laser drilling.

17. The method as recited in claim 13, wherein the step of forming openings in the cell walls comprises electron beam drilling.

18. The method as recited in claim 13, wherein the step of forming openings in the cell walls comprises chemical etching.

19. The method of claim 15 wherein the openings having respective diameters in the range of 0.002 to 0.006 inches.

* * * * *